(12) United States Patent
Bhorkar et al.

(10) Patent No.: US 9,730,220 B2
(45) Date of Patent: *Aug. 8, 2017

(54) LISTEN BEFORE TALK FOR CELLULAR IN UNLICENSED BAND

(71) Applicant: Intel IP Corporation, Santa Clara, CA (US)

(72) Inventors: Abhijeet Bhorkar, Fremont, CA (US); Christian Ibars Casas, San Jose, CA (US); Pingping Zong, Randolph, NJ (US); Apostolos Papathanassiou, San Jose, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/185,890

(22) Filed: Jun. 17, 2016

(65) Prior Publication Data

US 2016/0295588 A1 Oct. 6, 2016

Related U.S. Application Data

(63) Continuation of application No. 14/669,736, filed on Mar. 26, 2015, now Pat. No. 9,392,614.

(Continued)

(51) Int. Cl.
*H04W 4/00* (2009.01)
*H04W 72/04* (2009.01)
(Continued)

(52) U.S. Cl.
CPC ....... *H04W 72/0446* (2013.01); *H04W 24/00* (2013.01); *H04W 72/1231* (2013.01);
(Continued)

(58) Field of Classification Search
CPC ............ H04W 72/0446; H04W 88/08; H04W 72/1263
See application file for complete search history.

(56) References Cited

U.S. PATENT DOCUMENTS 9,326,157 B1 4/2016 Bhorkar et al.
9,392,614 B2 7/2016 Bhorkar et al.
(Continued)

FOREIGN PATENT DOCUMENTS

CN 106465425 A 2/2017
KR 1020160148674 A 12/2016
(Continued)

OTHER PUBLICATIONS

"U.S. Appl. No. 15/085,340, Preliminary Amendment filed Jun. 29, 2016", 8 pgs.

(Continued)

*Primary Examiner* — Clemence Han
(74) *Attorney, Agent, or Firm* — Schwegman Lundberg & Woessner, P.A.

(57) ABSTRACT

Disclosed in some examples are systems, machine-readable media, methods, and cellular wireless devices which implement a Listen Before Talk (LBT) access scheme for a device operating according to a cellular wireless protocol in an unlicensed channel. A cellular wireless device may utilize the cellular wireless protocol in the unlicensed channel after the LBT access scheme has determined that a channel (a defined range of frequencies) in the unlicensed channel is idle for a particular period of time.

20 Claims, 5 Drawing Sheets

Related U.S. Application Data (60) Provisional application No. 62/019,316, filed on Jun. 30, 2014.

(51) Int. Cl.
  H04W 24/00 (2009.01)
  H04W 72/12 (2009.01)
  H04W 88/08 (2009.01)
  H04W 28/26 (2009.01)
  H04W 88/10 (2009.01)

(52) U.S. Cl.
  CPC ....... H04W 72/1263 (2013.01); H04W 88/08 (2013.01); *H04W 28/26* (2013.01); *H04W 88/10* (2013.01)

(56) References Cited

U.S. PATENT DOCUMENTS

| | | |
|---|---|---|
| 2006/0223448 A1 | 10/2006 | Kruys |
| 2007/0026868 A1 | 2/2007 | Schuktz et al. |
| 2012/0077510 A1 | 3/2012 | Chen et al. |
| 2013/0156019 A1 | 6/2013 | Chen |
| 2013/0203458 A1 | 8/2013 | Charbit et al. |
| 2013/0294356 A1 | 11/2013 | Bala et al. |
| 2013/0337821 A1 | 12/2013 | Clegg |
| 2014/0036818 A1 | 2/2014 | Koskela et al. |
| 2014/0036889 A1 | 2/2014 | Kim et al. |
| 2014/0112289 A1 | 4/2014 | Kim et al. |
| 2014/0342745 A1* | 11/2014 | Bhushan ............ H04L 5/1469 455/450 |
| 2015/0085683 A1 | 3/2015 | Sadek et al. |
| 2015/0131516 A1 | 5/2015 | Zhang |
| 2015/0163681 A1 | 6/2015 | Sadek |
| 2015/0181453 A1 | 6/2015 | Chen et al. |
| 2015/0201429 A1 | 7/2015 | Chen et al. |
| 2015/0223244 A1 | 8/2015 | Tabet et al. |
| 2015/0237548 A1 | 8/2015 | Luo et al. |
| 2015/0382374 A1 | 12/2015 | Bhorkar et al. |
| 2016/0007368 A1 | 1/2016 | Moon |
| 2016/0135055 A1 | 5/2016 | Bhorkar et al. |
| 2016/0255648 A1 | 9/2016 | Frenne et al. |

FOREIGN PATENT DOCUMENTS

| | | |
|---|---|---|
| WO | WO-2012078565 A1 | 6/2012 |
| WO | WO-2013086659 A1 | 6/2013 |
| WO | WO-2016003674 A1 | 1/2016 |
| WO | WO-2016073616 A1 | 5/2016 |

OTHER PUBLICATIONS

"Broadband Radio Access Networks (BRAN); 5 GHz high performance RLAN; Harmonized EN covering the essential requirements of article 3.2 of the R&TTE Directive", ETSI EN 301 893 V1.7.2, (Jul. 2014), 95 pgs.

"U.S. Appl. No. 14/669,736, Corrected Notice of Allowance mailed Jun. 13, 2016", 4 pgs.

"U.S. Appl. No. 14/669,736, Non Final Office Action mailed Sep. 1, 2015", 11 pgs.

"U.S. Appl. No. 14/669,736, Notice of Allowance mailed Feb. 26, 2016", 7 pgs.

"U.S. Appl. No. 14/669,736, Response filed Jan. 4, 2016 to Non Final Office Action mailed Sep. 1, 2015", 10 pgs.

"U.S. Appl. No. 14/711,278, Notice of Allowance mailed Dec. 18, 2015", 9 pgs.

"International Application Serial No. PCT/US2015/036674, International Search Report mailed Sep. 30, 2015", 3 pgs.

"International Application Serial No. PCT/US2015/036674, Written Opinion mailed Sep. 30, 2015", 9 pgs.

"International Application Serial No. PCT/US2015/059051, International Search Report mailed Feb. 15, 2016", 3 pgs.

"International Application Serial No. PCT/US2015/059051, Written Opinion mailed Feb. 15, 2016", 4 pgs.

"U.S. Appl. No. 15/085,340, Non Final Office Action mailed Jan. 23, 2017", 7 pgs.

"International Application Serial No. PCT/US2015/036674, International Preliminary Report on Patentability mailed Jan. 12, 2017", 11 pgs.

\* cited by examiner

LISTEN BEFORE TALK FOR CELLULAR IN UNLICENSED BAND

PRIORITY CLAIM

This patent application is a continuation of U.S. application Ser. No. 14/669,736, filed Mar. 26, 2015, which claims the benefit of priority under 35 U.S.C. Section 119 to U.S. Provisional Patent Application Ser. No. 62/019,316, filed on Jun. 30, 2014, all of which are hereby incorporated by reference herein in their entirety.

TECHNICAL FIELD

Embodiments pertain to cellular wireless technologies. Some embodiments relate to cellular wireless technologies operating in unlicensed communication bands.

BACKGROUND

Cellular technologies typically operate in a licensed frequency spectrum. A licensed frequency spectrum is a range of frequencies that are exclusively assigned to a particular entity (e.g., a particular wireless carrier) for use. As the available licensed frequency spectrums are limited and as demand rises for cellular wireless services, the amount of free assigned spectrum available for use is limited.

In contrast to licensed frequency spectrums, there are various unlicensed frequency spectrums which allow for use of certain frequencies without an entity obtaining legal approval. These frequencies are shared amongst devices which wish to use them, and devices that use these spectrums have protocols to allow them to share the spectrum with other devices. Often these unlicensed spectrums are not licensed primarily for cellular wireless uses, and often these spectrums are subject to contention or utilization by other devices.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

As demand for licensed spectrum for cellular wireless protocols such as Long Term Evolution (LTE) increases, designers of LTE systems have begun to explore the use of these licensed protocols in unlicensed frequencies. Usage of cellular and other licensed protocols in unlicensed frequencies presents certain challenges.

For example, cellular wireless devices (e.g., a base station or a mobile device such as a smart phone) utilize licensed channels which ensure that these devices have exclusive use of the particular wireless channel. A "channel" is a band of (usually but not always contiguous) frequencies used for wireless communications. As a result, a design assumption of these cellular protocols is that they have exclusive access to the frequencies on which they operate. They are generally only concerned with coordinating amongst other devices participating in the same network. For example, in LTE systems, a base station (an eNodeB) typically coordinates transmission and reception from one or more User Equipment (UE) that are associated with the eNodeB. The eNodeB generally does not consider other users in other networks when planning transmission and reception of data. If a cellular wireless network began transmitting in the unlicensed channel without modification, the cellular wireless devices would transmit and receive continuously. This would prevent other devices from utilizing the channel.

In contrast, devices operating in unlicensed channels consider not only devices operating in a single network (e.g. controlled by a single operator), but devices operating in many different networks and devices operating using other protocols. For example, devices operating according to wireless protocols such as an 802.11 standard defined by the Institute for Electrical and Electronics Engineers (IEEE) (Wi-Fi) consider not only devices in their own network (i.e., a Basic Service Set—BSS), but devices in other BSSs and indeed devices running other protocols before determining whether they can use the wireless medium.

What is therefore needed is a method for adapting a cellular wireless protocol to operate in an unlicensed channel in a manner that allows the cellular wireless protocol to share the unlicensed channel with other devices. Disclosed in some examples are systems, machine-readable media, methods, and cellular wireless devices which implement a Listen-Before-Talk (LBT) access scheme for a device operating according to a cellular wireless protocol in an unlicensed band. A cellular wireless device may utilize the cellular wireless protocols in the unlicensed channels after the LBT access scheme has determined that the channel (a defined range of frequencies in a particular spectrum) in the unlicensed spectrum is idle for a particular period of time.

A "cellular wireless device," as used herein, is any device that is operating according to a cellular wireless protocol. A "cellular wireless protocol" is a wireless protocol defining a cellular wireless network which is distributed over land areas called cells, each cell served by at least one fixed-location transceiver, known as a cell site or base station. These cell sites are interconnected to provide wireless services over a wide geographic area. Example cellular wireless protocols that may be adapted for transmission in the unlicensed channels include cellular wireless protocols according to one of an LTE family of standards promulgated by the Third Generation Partnership Project (3GPP), a Universal Mobile Telecommunications System (UMTS) family of standards promulgated by 3GPP, a Global System for Mobile Communications (GSM) family of standards, and the like. A cellular wireless device may be a base station such as a NodeB or an eNodeB, or may be a mobile device such as a User Equipment (UE).

A cellular wireless device may use the licensed band for controlling transmissions and other parameters used on the unlicensed band. This may include obtaining CSI feedback, scheduling decisions on PDCCH, and the like.

Example transmissions of the cellular wireless devices in the unlicensed channel include transmissions to support one or more of Layer 1, Layer 2, Layer 3, and other layers of these cellular protocols, for example, the Physical (PHY) layer, the Media Access Control (MAC) layer, the Radio Link Control (RLC) layer, the Packet Data Convergence Protocol (PDCP), and the Radio Resource Control (RRC) layers. Channels transmitted in the unlicensed frequency may include any uplink data channels, uplink control channels, downlink data channels, and downlink control channels. Examples include one or more of a Physical Downlink Shared Channel (PDSCH), a Physical Uplink Shared Channel (PUSCH), a Physical Downlink Control Channel (PDCCH), and a Physical Uplink Control Channel (PUCCH).

In some examples, a cellular wireless device such as a cellular base station (e.g., eNodeB) may provide a cell with uplink and downlink capabilities in the licensed spectrum and also provide a supplemental downlink (SDL) channel in an unlicensed spectrum. The SDL channel may carry one or more LTE channels, such as a PDSCH. The LBT techniques may be applied to the SDL channel to ensure that the unlicensed channels are idle and free of interference. In other examples, for uplink channels on the unlicensed spectrum, the UE may be the cellular wireless device which implements the LBT mechanisms. In some examples, the SDL may be scheduled on a PDCCH on the primary (licensed) frequencies. For example, the UE may be scheduled on the PDCCH of a licensed frequency for receiving data on the SDL PDSCH on the unlicensed frequency (i.e., using cross carrier scheduling). In some examples, the PDCCH that schedules the unlicensed channel may be sent on the unlicensed channel.

Aspects of the cellular wireless protocols may be modified in one or more ways such as disclosed herein in order to operate within the unlicensed frequency spectrum. For example, an LBT access scheme may be implemented in the cellular wireless protocol by the cellular wireless device. In some examples, the cellular wireless device implementing an LBT access mode for the unlicensed band may listen to the channel for a channel listen time (a predetermined period of time). If the channel is idle for the channel listen time, the cellular wireless device may deem that the channel is available for transmission.

In some examples, the cellular wireless device may determine that the channel is idle by comparing the average detected power on the channel over the channel listen time to a predetermined power level threshold. If the average detected power is below the power level threshold, then the channel may be deemed available for transmission; otherwise, if the average detected power is above the power level threshold, then the channel may be deemed busy.

Alternatively, instead of using an average detected power for the entirety of the channel listen time, if at any point during the channel listen time the detected channel power exceeds a power level threshold, then the cellular wireless device may deem the channel busy. Otherwise, if at no point during the channel listen time does the detected channel power exceed the power level threshold, then the cellular wireless device may deem the channel available.

Once the cellular wireless device has determined that the medium is available, in an asynchronous mode, the cellular wireless device may transmit immediately. In other examples, in a synchronous mode, in response to determining that the wireless medium is available, the cellular wireless device may reserve the medium using a medium reservation technique and wait for a sub-frame boundary of the cellular wireless protocol prior to transmitting.

Figure 1A:
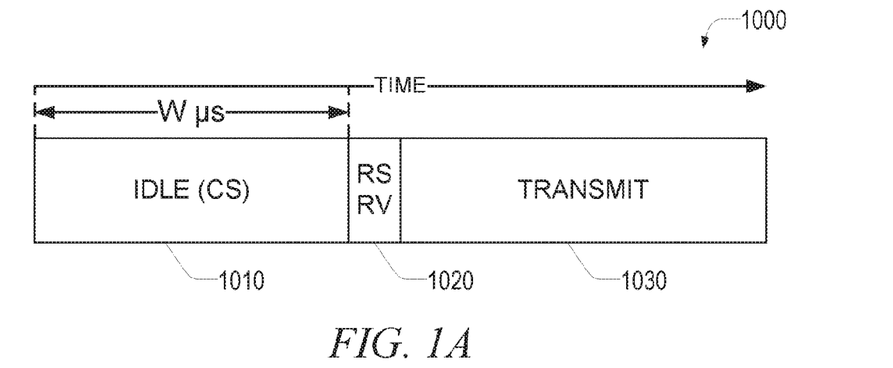
FIG. 1A is a timeline of a Listen Before Talk (LBT) method according to some examples of the present disclosure.

Turning now to FIG. 1A, a timeline 1000 of a cellular wireless device operating asynchronously in an unlicensed channel using an LBT mechanism is shown. The device measures the power level of the channel for the channel listen time 1010. In FIG. 1A, the channel listen time 1010 is W μs. In some examples, the device determines that the medium is idle by conducting carrier sensing (CS) for the channel listen time 1010 and measuring the average power received over that period. If the average power received during the period is below a power level threshold (e.g., −62 dBm), then the cellular wireless device may deem the medium to be idle and available for transmission. In some examples, this method of detecting that the medium is idle differs from that of Wi-Fi carrier sensing. In Wi-Fi carrier sensing, A Wi-Fi device uses both an energy detection mechanism and a signal detection mechanism. If the Wi-Fi device detects a Wi-Fi signal using the signal detection mechanism, the Wi-Fi device assumes that the channel is occupied. In some examples, the LBT method disclosed herein uses only the energy detection mechanism and not the Wi-Fi signal detection mechanisms.

Once the medium is idle, the cellular wireless device may optionally transmit a reservation message (RSRV) 1020. This reservation message may be any transmission which is designed to trigger the channel sense mechanism of one or more protocols operating on the channel of the unlicensed channel to view the channel as busy. One example reservation message 1020 may be a simple transmission above a certain power level which is designed to trigger other wireless devices to detect this energy on the channel and to determine, based upon this energy, that the channel is not idle.

In some examples, this message may be specific to a wireless protocol operating in the unlicensed band. For example, a Wi-Fi message may be transmitted by the cellular wireless device on the unlicensed channel. The reservation message may reserve the channel for the transmissions of the cellular wireless device. In some examples, this message may be a Wi-Fi Request-To-Send (RTS) or Clear-To-Send (CTS) message. These messages may be sent by modifying the cellular wireless protocol circuitry to transmit these messages of other protocols, or may be sent by adding protocol circuitry to send messages for other protocols (e.g., adding a Wi-Fi chip to an eNodeB). The RTS or CTS messages may have a duration field which may specify the duration that the cellular wireless device needs the unlicensed channel.

The RTS/CTS messages may be transmitted to one or more cellular wireless devices. The RTS/CTS message may be broadcast to the intended UEs. The intended UEs may detect if the channel is idle. The RTS/CTS may be transmitted in time or frequency multiplexed manner.

The cellular wireless device may then transmit 1030 using the cellular protocol. The cellular wireless device may send one or more uplink or downlink cellular wireless channels carrying control or user data. In some examples, the cellular wireless device may transmit one or more wireless subframes.

Figure 1B:
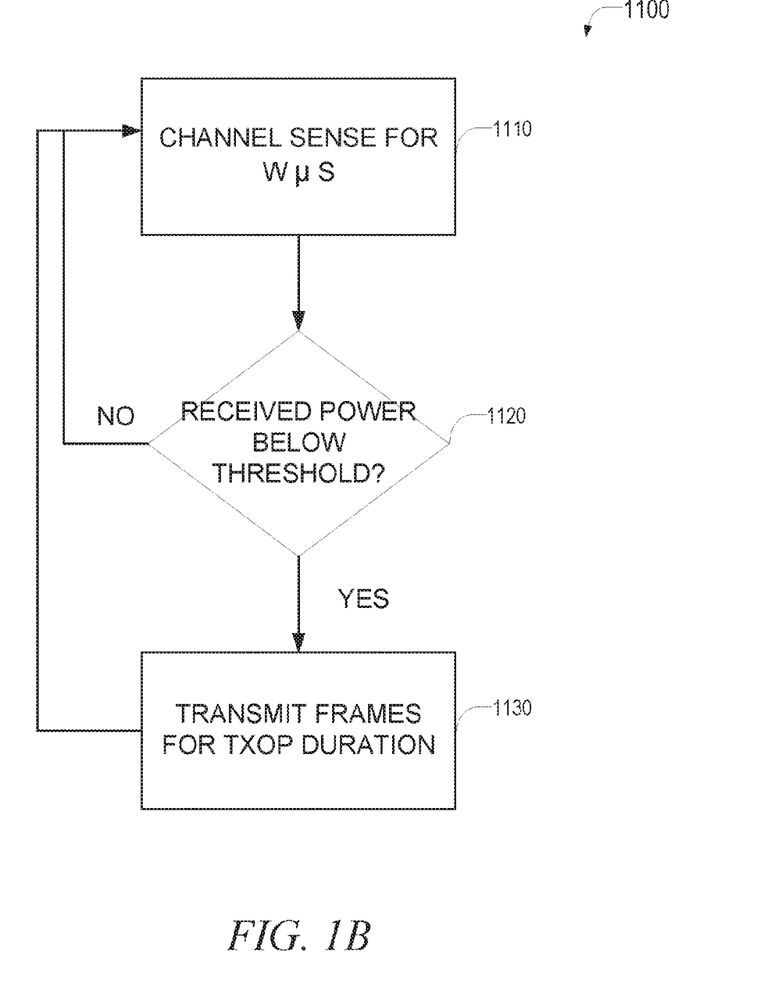
FIG. 1B is a flowchart of a LBT method according to some examples of the present disclosure.

FIG. 1B shows one example method 1100 of employing an asynchronous LBT mechanism for a cellular wireless device according to some examples of the present disclosure. At operation 1110 the cellular wireless device senses the channel for a channel listen time (e.g., W μs). At operation 1120, the cellular wireless device determines if the channel is idle. In some examples the cellular wireless device determines if the channel is idle by determining that an average received power for the channel listen time is below a power level threshold. If the channel is not deemed to be idle, the device may go back and repeat operations 1110 and 1120 until the channel is deemed idle. Once the channel is deemed idle, at operation 1130 the cellular wireless device may transmit data for the duration of the transmission opportunity (TXOP). In some examples, prior to transmitting data at operation 1130 the cellular wireless device may send a reservation message. In some examples W may be 34 μs.

Figure 2A:
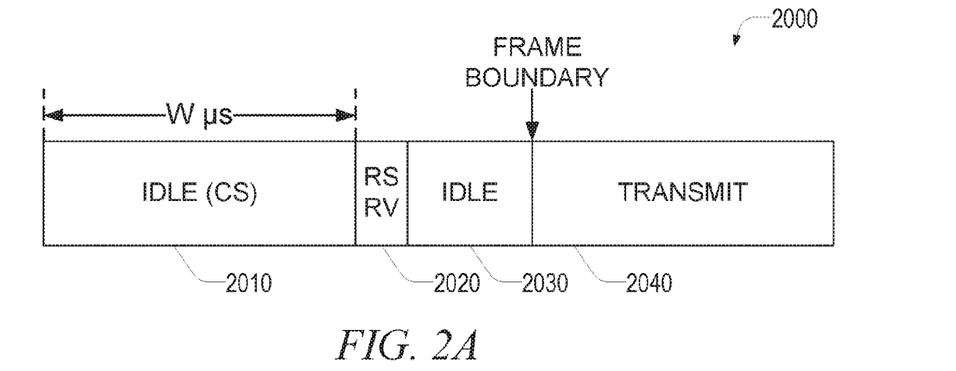
FIG. 2A is a timeline of a LBT method according to some examples of the present disclosure.

Turning now to FIG. 2A, a timeline 2000 of a cellular wireless device operating synchronously in an unlicensed channel using an LBT mechanism is shown. The device senses that the medium is idle for a channel listen time 2010. In FIG. 2A, the channel listen time 2010 is W μs. In some examples, the device determines that the medium is idle by conducting carrier sensing (CS) for the channel listen time and measuring the average power received. If the average power received during this period is below a power level threshold, then the cellular wireless device may deem the medium to be idle.

Once the medium is idle, the cellular wireless device may transmit a reservation message (RSRV) 2020. In some examples, the reservation message 2020 may be a message from another wireless protocol, such as a Wi-Fi message, and may be transmitted by the cellular wireless device. This message may reserve the wireless medium for the transmissions of the cellular wireless device. In some examples, this message may be a CTS or RTS message. These messages may be sent by modifying the cellular wireless protocol circuitry to transmit messages of other protocols, or may be sent by adding protocol circuitry to send messages for other protocols (e.g., adding a Wi-Fi chip to an eNodeB).

In the case of FIG. 2A, the reservation message 2020 reserves the wireless medium for the cellular wireless device for the desired transmission opportunity (TXOP) 2040 as well as the amount of time to send the data at the synchronized time (e.g., enough time to wait for a sub-frame boundary). For example, the reservation message 2020 may be the sum of the TXOP (transmission 2040) plus the idle period 2030 that is the period of time that elapses before the start of the next sub-frame of the cellular wireless protocol.

Figure 2B:
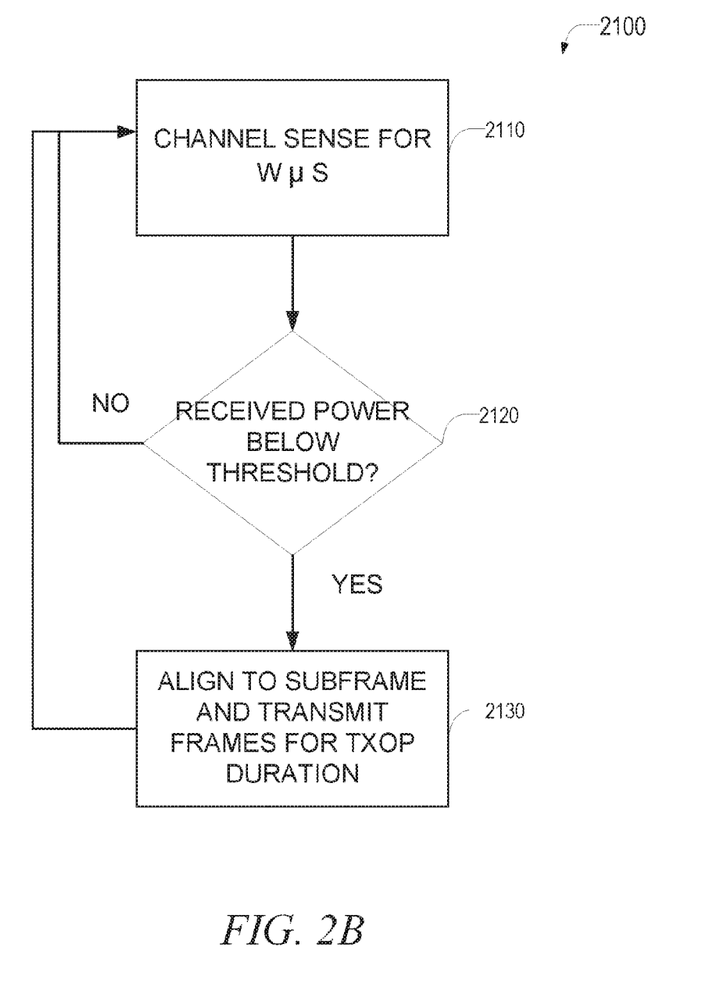
FIG. 2B is a flowchart of a LBT method according to some examples of the present disclosure.

FIG. 2B shows an example method 2100 of employing a synchronous LBT mechanism for a cellular wireless device according to some examples of the present disclosure. At operation 2110 the cellular wireless device senses the channel for a channel listen time (e.g., W μs). At operation 2120, the cellular wireless device determines if the channel is idle. In some examples the cellular wireless device determines that the channel is idle by determining that an average received power for the channel listen time is below a power level threshold. If the channel is not deemed to be idle, the device may go back and repeat operations 2110 and 2120 until the channel is deemed idle. Once the channel is deemed idle, at operation 2130 the cellular wireless device aligns to the sub-frame and transmits data for the duration of the transmission opportunity. In some examples, prior to transmitting data at operation 2130 the cellular wireless device may send a reservation message.

Figure 3:
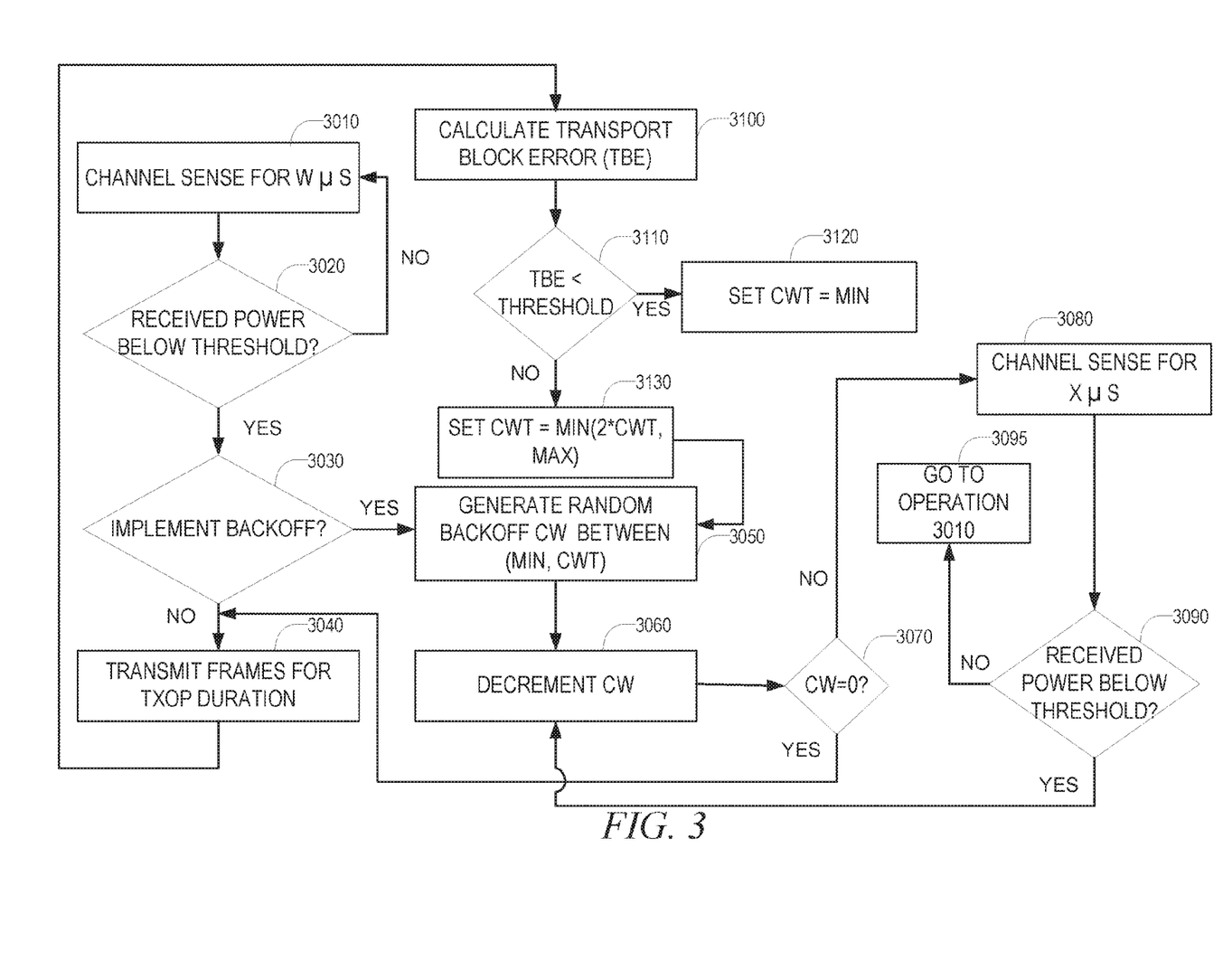
FIG. 3 is a flowchart of a LBT method with a backoff according to some examples of the present disclosure.

In some examples, the LBT technique may include a backoff procedure to avoid collisions in the presence of a large number of transmitters. FIG. 3 shows one example method of an LBT technique including a backoff procedure. At operation 3010 the cellular wireless device senses the channel for the channel listen time. If the average received power is not below the power level threshold at operation 3020, the cellular wireless device may continue to sense the channel at operation 3010. If the received power is below the power level threshold at operation 3020, and if the cellular wireless device determines not to implement the backoff at operation 3030, the cellular wireless device may transmit data for the duration of the transmission opportunity at operation 3040. As noted with respect to FIGS. 1&2, the cellular wireless device may send a reservation message, and in some examples may align to a sub-frame boundary.

If at operation 3030 the cellular wireless device determines that a backoff operation should be implemented, the cellular wireless device may calculate a random backoff contention window (CW) between an absolute minimum (MIN) value and a current maximum value (CWT) at operation 3050. The CWT may be initially set at the MIN level. At operation 3060 the cellular wireless device may decrement the contention window CW. At operation 3070 it is determined if the CW is zero. If the CW is zero, the cellular wireless device may proceed to operation 3040 to send data over the unlicensed channel. If the CW is not zero at operation 3070 the cellular wireless device senses the channel for X μs at operation 3080. In some examples X is 9 μs. X and W may be the same or different values. In some examples, MIN may be 3 and MAX may be 1023.

If the received power is below a predetermined threshold at operation 3090, then the cellular wireless device decrements CW at operation 3060 and the cellular wireless device repeats operations 3070, 3080, and 3090 until the CW is zero (at which time the cellular wireless device transmits on the unlicensed channel at operation 3040) or until the received power is not below the threshold at operation 3090. If the received power is not below the threshold at operation 3090, then at operation 3095 the cellular wireless device goes back to operation 3010. In some examples the threshold power level at operation 3090 may be the same as or different than the threshold power level at operation 3020. In some examples, the thresholds may be −62 dbm. The backoff process may be deemed successful once the CW is zero.

Once data is transmitted at operation 3040, in some examples, the cellular wireless device may determine if a collision occurred during the transmission. In some examples, to do this, the cellular wireless device may calculate a transport block error (TBE) rate at operation 3100. At operation 3110 the TBE may be compared to a predetermined error threshold. In some examples the predetermined error threshold may be 0.5. If the TBE is below the predetermined error threshold, the cellular wireless device may infer that the transmission was successful and was not interfered with. In this case, at operation 3120, the current maximum value CWT may be set to the MIN value, which may be used the next time the CW is determined. At this point, the flow ends until the next time the cellular wireless device has data to send and starts the process over at operation 3010. If the TBE is above or equal to the predetermined threshold, then the cellular wireless device may set the current maximum CWT to be double the previous CWT up to a global maximum value MAX at operation 3130. A new backoff CW is selected at operation 3050 and the backoff process is repeated as the cellular wireless device will attempt to retransmit the blocks that had errors.

In contrast to Wi-Fi, the LBT mechanism disclosed herein, in some examples, utilizes a transport block error measurement. TBE is defined specifically by the cellular wireless protocol, but in general is a measure of how successful a data transmission is over the air at the Physical/MAC layer level. For LTE, if a transport block is successfully decoded then the transmission is successful. Successful decoding is when the Cyclic Redundancy Check (CRC) calculated by the receiver matches the CRC sent in the transport block. The TBE is a percentage or ratio of successful blocks. Wi-Fi, in contrast, assumes that a failure to receive an acknowledgement of a packet indicates a collision.

As already noted, in some examples, at operation 3040 the cellular wireless device may send a reservation message in order to prevent other wireless devices from accessing the medium. Also, at operation 3040 the cellular wireless device may wait for a cellular sub-frame boundary before transmitting.

Figure 4:
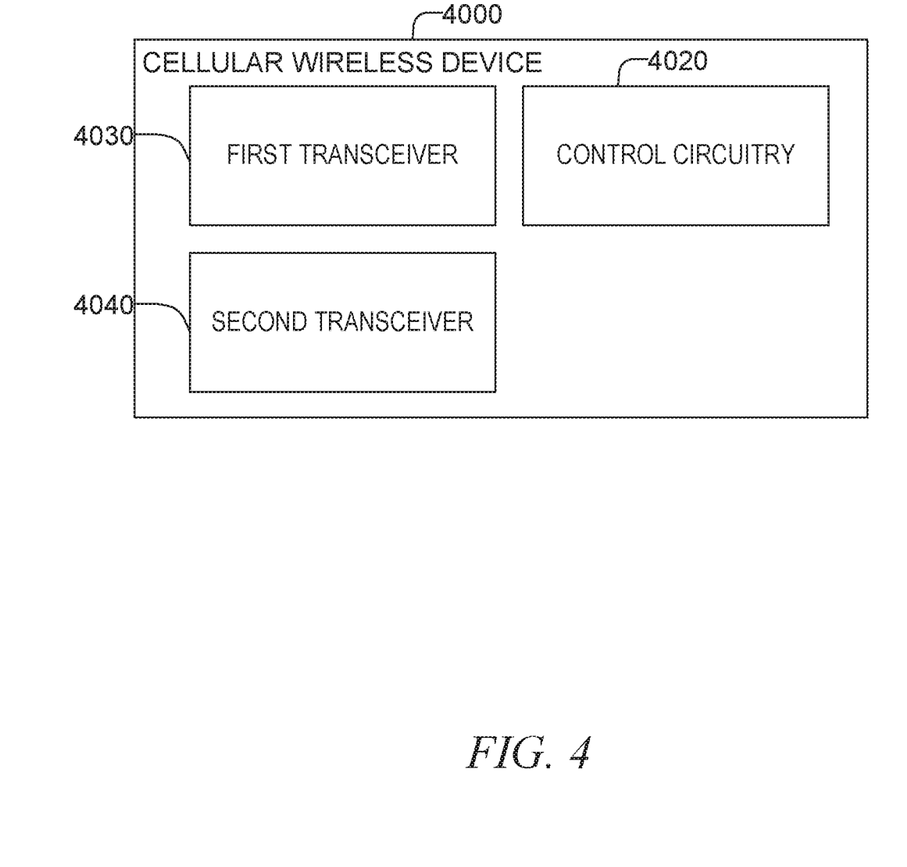
FIG. 4 is a schematic of a cellular wireless device according to some examples of the present disclosure.

Turning now to FIG. 4, a schematic of a cellular wireless device 4000 is shown according to some examples. The cellular wireless device 4000 may be any device that is capable of communicating using a licensed cellular protocol. The cellular wireless device 4000 may be a nodeB, an eNodeB, a UE, a Base Transceiver Station (BTS), a Wi-Fi access point, a cell phone, a smart phone, a desktop computer, a laptop computer, a medical device (e.g., a heart rate monitor, a blood pressure monitor, or the like), a wearable device (e.g., computing glasses, a smart watch), or the like.

The cellular wireless device 4000 may contain a first wireless transceiver 4030, a second wireless transceiver 4040, and control circuitry 4020 for controlling the first and second wireless transceivers. The first wireless transceiver 4030 may operate on an unlicensed channel and in some examples, implement a wireless protocol that is not a cellular wireless protocol. In some examples, the first wireless transceiver 4030 may implement a wireless protocol that operates in the unlicensed channels, such as an IEEE 802.11 wireless protocol, a Bluetooth wireless protocol, a Bluetooth Low Energy (BLE) wireless protocol, a Zigbee wireless protocol, or the like. In some examples, the first wireless transceiver 4030 may determine whether the unlicensed channel is occupied with other traffic. In some examples, the first transceiver 4030 may detect the power level on the unlicensed channel and if the average power level is below a particular threshold for a predetermined period of time, then the control circuitry 4020 may determine that the channel is unoccupied. If the average power level is above the particular threshold for the predetermined period of time, then the control circuitry 4020 may determine that the channel is occupied. If the channel is occupied, control circuitry 4020 may instruct the first transceiver 4030 to continue to sense the channel until the received average power level is below the predetermined threshold for the predetermined period of time.

Control circuitry 4020 may control the backoff process once the channel is deemed unoccupied. The control circuitry 4020 may, in cooperation with the first transceiver 4030, cause the operations of FIG. 3 to be implemented, such as selecting a random contention window, decrementing the contention window, using the first transceiver 4030 to sense the channel for X μs, determining if the backoff period is over, or, if activity is detected on the channel during the backoff period, signaling the first transceiver 4030 to once again determine if the medium is free by detecting the power level on the unlicensed channel for a channel listen period of time. Once the control circuitry and first transceiver have determined that the channel is once again free, the control circuitry 4020 will start over and once again implement the backoff procedure.

The second wireless transceiver 4040 may implement a cellular wireless protocol and may generally transmit over a licensed frequency. Example cellular wireless protocols may include a Long Term Evolution (LTE family of standards promulgated by the Third Generation Partnership Project (3GPP), Universal Mobile Telecommunications (UMTS) promulgated by 3GPP, an Institute for Electrical and Electronics Engineers (IEEE) 802.16 standard known as Worldwide Interoperability for Microwave Access (WiMAX), and the like. The second transceiver 4040 may provide for one or more protocol layers of the cellular wireless protocol to enable communications. For example, if the cellular wireless device 4000 is an eNodeB, the second transceiver 4040 provides the functionality to implement the eNodeB. If the cellular wireless device 4000 is a UE, the second transceiver 4040 provides the functionality to connect to the cellular network and transfer data across that network. The second transceiver 4040 may utilize the licensed bandwidth, but may also have circuitry to send and receive data across the unlicensed bandwidth.

Control circuitry 4020 may control the first transceiver 4030, as well as second transceiver 4040. When the control circuitry 4020 determines that the unlicensed channels should be used for the cellular wireless protocol, the control circuitry 4020 may determine when the channel is free using first transceiver 4030, and in some examples, to reserve the channel using a channel reservation message via first transceiver 4030. Once the channel is free, the control circuitry 4020 may instruct either the first or second transceivers 4030 and 4040 to transmit on the unlicensed band.

In some examples, the cellular wireless device 4000 may send a reservation message on the unlicensed channels. In some examples, the reservation message has a duration field which may be set to the duration of cellular data transfer (e.g., a sub-frame). In some examples, the cellular wireless device 4000 may not begin transmitting until a sub-frame boundary. In these examples, if a reservation message is sent, the reservation message may have a duration equal to the duration of cellular data transfer plus the amount of time until the next sub-frame boundary.

After the transmission, the control circuitry 4020 may determine if the transmission was successful. In some examples, the transmission may be deemed successful if a TBE measurement is below a predetermined threshold. If the TBE measurement is below the predetermined threshold, the contention window for the next transmission may be set to the minimum contention window value (MIN) by setting the maximum value used in the random selection (e.g., at operation 3050 in FIG. 3) to the minimum value (MIN).

If the TBE measurement is not below the predetermined threshold, the next contention window may be doubled and the backoff process may be started for retransmitting the data.

Figure 5:
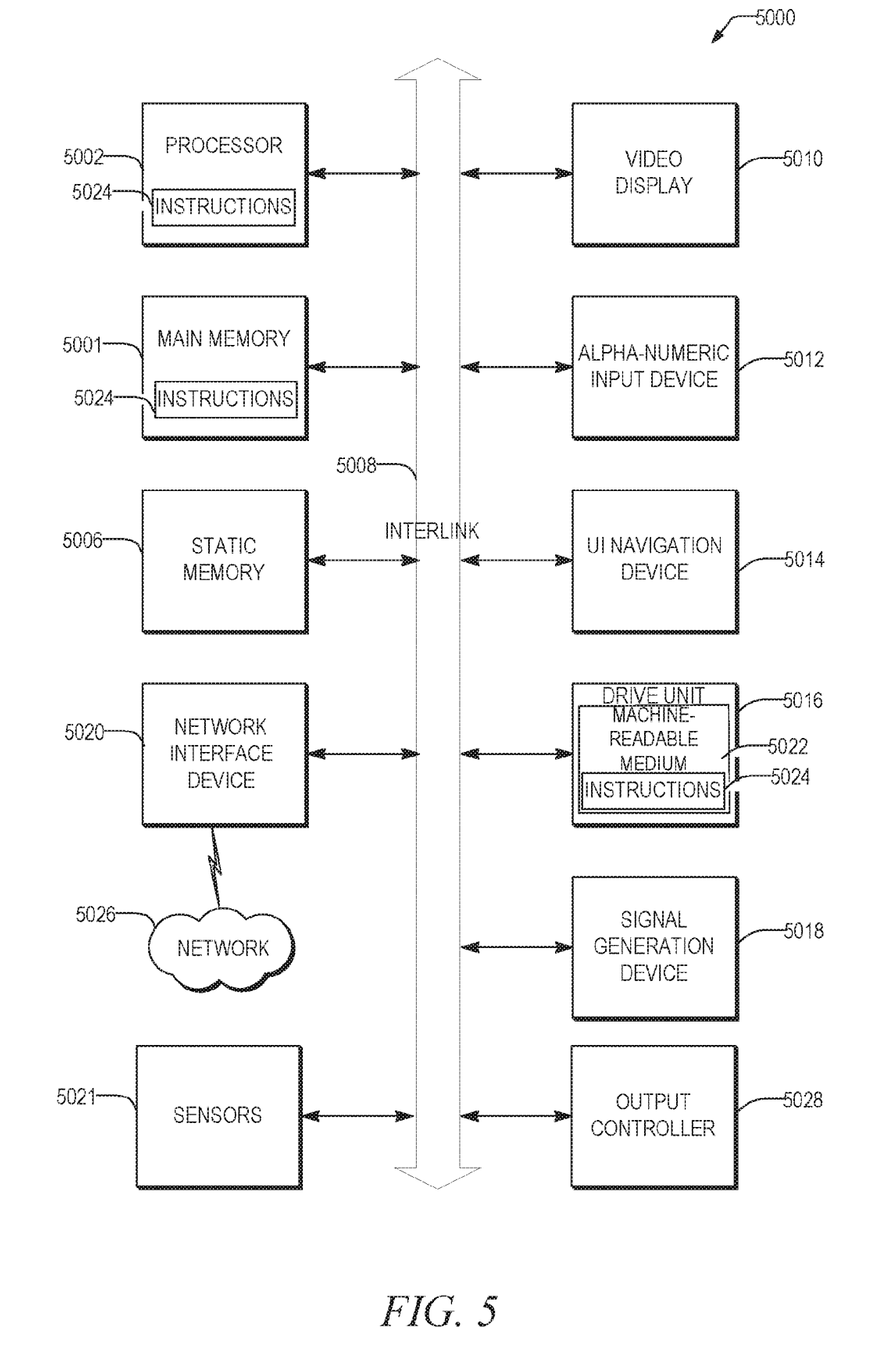
FIG. 5 is a block diagram illustrating an example of a machine upon which one or more embodiments may be implemented.

FIG. 5 illustrates a block diagram of an example machine 5000 upon which any one or more of the techniques (e.g., methodologies) discussed herein may be performed. In alternative embodiments, the machine 5000 may operate as a standalone device or may be connected (e.g., networked) to other machines. In a networked deployment, the machine 5000 may operate in the capacity of a server machine, a client machine, or both in server-client network environments. In an example, the machine 5000 may act as a peer machine in peer-to-peer (P2P) (or other distributed) network environment. The machine 5000 may be a cellular wireless device, a wireless device, or the like. Example cellular wireless devices include an eNodeB, a UE, a personal computer (PC), a tablet PC, a set-top box (STB), a personal digital assistant (PDA), a mobile telephone, a web appliance, a network router, switch, or bridge, or any machine capable of executing instructions (sequential or otherwise)

that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include, or may operate on, logic or a number of components, modules, circuitry, or mechanisms. Modules and circuitry are tangible entities (e.g., hardware) capable of performing specified operations and may be configured or arranged in a certain manner. In an example, circuits may be arranged (e.g., internally or with respect to external entities such as other circuits) in a specified manner as circuitry. In an example, the whole or part of one or more computer systems (e.g., a standalone, client, or server computer system) or one or more hardware processors may be configured by firmware or software (e.g., instructions, an application portion, or an application) as circuitry that operates to perform specified operations.

Accordingly, the term "circuitry" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which circuitry is temporarily configured, each of the circuits need not be instantiated at any one moment in time. For example, where the circuits comprise a general-purpose hardware processor configured using software, the general-purpose hardware processor may be configured as respective different circuitry at different times. Software may accordingly configure a hardware processor, for example, to constitute a particular circuit at one instance of time and to constitute a different circuit at a different instance of time.

The machine (e.g., computer system) 5000 may include a hardware processor 5002 (e.g., a central processing unit (CPU), a graphics processing unit (GPU), a hardware processor core, or any combination thereof), a main memory 5001, and a static memory 5006, some or all of which may communicate with each other via an interlink (e.g., bus) 5008. The machine 5000 may further include a display unit 5010, an alphanumeric input device 5012 (e.g., a keyboard), and a user interface (UI) navigation device 5014 (e.g., a mouse). In an example, the display unit 5010, alphanumeric input device 5012, and UI navigation device 5014 may be a touch screen display. The machine 5000 may additionally include a storage device (e.g., drive unit) 5016, a signal generation device 5018 (e.g., a speaker), a network interface device 5020, and one or more sensors 5021, such as a global positioning system (GPS) sensor, compass, accelerometer, or other sensor. The machine 5000 may include an output controller 5028, such as a serial (e.g., universal serial bus (USB)), parallel, or other wired or wireless (e.g., infrared (IR), near field communication (NFC), etc.) connection to communicate with or control one or more peripheral devices (e.g., a printer, card reader, etc.).

The storage device 5016 may include a machine readable medium 5022 on which is stored one or more sets of data structures or instructions 5024 (e.g., software) embodying or utilized by any one or more of the techniques or functions described herein. The instructions 5024 may also reside, completely or at least partially, within the main memory 5001, within the static memory 5006, or within the hardware processor 5002 during execution thereof by the machine 5000. In an example, one or any combination of the hardware processor 5002, the main memory 5001, the static memory 5006, or the storage device 5016 may constitute machine readable media.

While the machine readable medium 5022 is illustrated as a single medium, the term "machine readable medium" may include a single medium or multiple media (e.g., a centralized or distributed database, and/or associated caches and servers) configured to store the one or more instructions 5024.

The term "machine readable medium" may include any medium that is capable of storing, encoding, or carrying instructions for execution by the machine 5000 and that cause the machine 5000 to perform any one or more of the techniques of the present disclosure, or that is capable of storing, encoding, or carrying data structures used by or associated with such instructions. A machine readable medium may include a non-transitory machine readable medium. A machine-readable medium is not a transitory propagating signal. Non-limiting machine readable medium examples may include solid-state memories, and optical and magnetic media. Specific examples of machine readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 5024 may further be transmitted or received over a communications network 5026 using a transmission medium via the network interface device 5020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., IEEE 802.11 family of standards known as Wi-Fi®, IEEE 802.16 family of standards known as WiMax®), IEEE 802.15.4 family of standards, and peer-to-peer (P2P) networks, among others. In an example, the network interface device 5020 may include one or more physical jacks (e.g., Ethernet, coaxial, or phone jacks) or one or more antennas to connect to the communications network 5026. In an example, the network interface device 5020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 5000, and includes digital or analog communications signals or other intangible media to facilitate communication of such software.

Other Notes and Non-Limiting Examples

Example 1 includes subject matter (such as a device, apparatus, or machine) comprising: a first transceiver to transmit and receive in an unlicensed channel using a first wireless protocol; a second transceiver to transmit and receive in a licensed channel in accordance with a cellular wireless protocol; a controller to: determine, via the first transceiver, that an average energy of the unlicensed channel over a predetermined period of time is below a predetermined threshold, and in response: send a wireless reservation message on the unlicensed channel via the first transceiver to reserve the unlicensed channel for a transmission of a Supplemental Downlink (SDL) Physical Downlink Shared Channel (PDSCH); schedule at least one User Equipment (UE) serviced by the eNodeB to receive data on the SDL PDSCH in the unlicensed channel via a Physical Downlink Control Channel (PDCCH) on the licensed channel transmitted by the second transceiver; and transmit the SDL PDSCH over the unlicensed channel at a cellular sub-frame boundary via the first transceiver.

In Example 2, the subject matter of Example 1 may include, wherein the cellular wireless protocol is a Long Term Evolution (LTE) or Long Term Evolution-Advanced (LTE-A) family of Standards defined by the Third Generation Partnership (3GPP).

In Example 3, the subject matter of any one of Examples 1 to 2 may include, wherein the first wireless protocol is a protocol according to an Institute for Electrical and Electronics Engineers (IEEE) 802.11 protocol.

In Example 4, the subject matter of any one of Examples 1 to 3 may include, wherein the wireless reservation message is one of: a Clear to Send (CTS) message or a Request to Send (RTS) message.

In Example 5, the subject matter of any one of Examples 1 to 4 may include, wherein the controller is to implement a backoff process, and wherein the controller is to refrain from sending the reservation message, scheduling the UE and transmitting the SDL PDSCH until the backoff process is successful.

In Example 6, the subject matter of any one of Examples 1 to 5 may include, wherein, a backoff length is determined based on a previous transmission.

In Example 7, the subject matter of any one of Examples 1 to 6 may include, wherein the unlicensed channel is a channel in the Industrial, Scientific, and Medical (ISM) bands.

In Example 8, the subject matter of any one of Examples 1 to 7 may include, wherein the cellular sub-frame boundary is a start of an LTE or LTE-A sub-frame.

In Example 9, the subject matter of any one of Examples 1 to 8 may include, wherein the wireless reservation message includes a duration field that is set to a time that is at least the sum of a time needed to reach the beginning of the sub-frame boundary and the time needed to transmit the SDL PDSCH.

In Example 10, the subject matter of any one of Examples 1 to 9 may include, wherein the second transceiver is configured to provide a PDCCH in a licensed channel.

Example 11 includes subject matter (such as a device, apparatus, or machine) comprising: sense a first channel for a predetermined period of time, the first channel a wireless channel that is not exclusively licensed for cellular wireless communications; determine that an average received power of the first channel indicates that the first channel is idle during the predetermined period of time; and in response to the determination that the first channel is idle: schedule at least one User Equipment (UE) serviced by the eNodeB to receive data on a Physical Downlink Shared Channel (PDSCH) transmitted on the first channel; communicate the schedule to the UE via a control channel on a second channel, the second channel a wireless channel that is licensed for cellular wireless communications; and transmit the PDSCH over the first channel via the first transceiver.

In Example 12, the subject matter of Example 11 may include, wherein the instructions configure the eNodeB to at least send a reservation message on the first channel in response to the determination that the first channel is idle.

In Example 13, the subject matter of any one of Examples 11 to 12 may include, wherein the reservation message is a message defined according to one of an Institute of Electrical and Electronics Engineers (IEEE) 802.11 family of standards.

In Example 14, the subject matter of any one of Examples 11 to 13 may include, wherein the reservation message has a duration field that is at least as large as a sum of a time until the sub-frame boundary and a time needed to send the sub-frame.

In Example 15, the subject matter of any one of Examples 11 to 14 may include, wherein the operations to transmit the PDSCH include operations to wait to transmit until a sub-frame boundary of the eNodeB.

In Example 16, the subject matter of any one of Examples 11 to 15 may include, wherein the instructions further configure the eNodeB to implement a backoff procedure prior to scheduling the UE.

In Example 17, the subject matter of any one of Examples 11 to 16 may include, wherein the eNodeB operates according to one of a Long Term Evolution (LTE) or Long Term Evolution-Advanced (LTE-A) wireless protocol.

Example 18 includes subject matter (such as a method, means for performing acts, machine readable medium including instructions that when performed by a machine cause the machine to performs acts, or an apparatus to perform) comprising: at an eNodeB: determine, via a first transceiver, that an average energy of a first channel over a predetermined period of time is below a predetermined threshold, the first channel a wireless channel that is not exclusively licensed for cellular wireless, and in response: select a random backoff period; determine that the average energy of the first channel over the backoff period is below a second threshold; schedule at least one User Equipment (UE) serviced by the eNodeB to receive data on a Supplemental Downlink (SDL) Physical Downlink Shared Channel (PDSCH) on the first channel; communicate the schedule to the UE by transmission of a Physical Downlink Control Channel (PDCCH) on a second channel by a second transceiver, the second channel a wireless channel that is licensed for cellular wireless; and transmit the SDL PDSCH over the unlicensed channel at a cellular sub-frame boundary via the first transceiver.

In Example 19, the subject matter of Example 18 may include providing a PDSCH on the second channel.

In Example 20, the subject matter of any one of Examples 18 to 19 may include, wherein the unlicensed channel is a frequency between 2.4 Ghz and 2.5 Ghz.

In Example 21, the subject matter of any one of Examples 18 to 20 may include, sending a wireless reservation message on the first channel.

In Example 22, the subject matter of any one of Examples 18 to 21 may include, wherein the wireless reservation message is a broadcast message.

In Example 23, the subject matter of any one of Examples 18 to 22 may include, wherein the wireless reservation message is a Clear To Send (CTS) message.

In Example 24, the subject matter of any one of Examples 18 to 23 may include, wherein the CTS message is transmitted in time multiplexed or frequency multiplexed manner.

In Example 25, the subject matter of any one of Examples 18 to 24 may include, wherein the wireless reservation message has a duration field that is set to a value that is at least the time until the sub-frame boundary plus the time necessary to transmit a PDSCH sub-frame.

In Example 26, the subject matter of any one of Examples 18 to 25 may include, wherein the predetermined threshold and the second threshold are the same value.

In Example 27, the subject matter of any one of Examples 18 to 26 may include, wherein the predetermined threshold and the second threshold are different values.

Example 28 includes subject matter (such as a device, apparatus, or machine) comprising: means for determine, via a first transceiver, that an average energy of a first channel over a predetermined period of time is below a predetermined threshold, the first channel a wireless channel that is not exclusively licensed for cellular wireless, and in response: means for selecting a random backoff period; means for determining that the average energy of the first channel over the backoff period is below a second threshold; means for scheduling at least one User Equipment (UE) serviced by the eNodeB to receive data on a Supplemental Downlink (SDL) Physical Downlink Shared Channel (PDSCH) on the first channel; means for communicating the schedule to the UE by transmission of a Physical Downlink Control Channel (PDCCH) on a second channel by a second transceiver, the second channel a wireless channel that is licensed for cellular wireless; and means for transmitting the SDL PDSCH over the unlicensed channel at a cellular sub-frame boundary via the first transceiver.

In Example 29, the subject matter of Example 28 may include, means for providing a PDSCH on the second channel.

In Example 30, the subject matter of any one of Examples 28 to 29 may include, wherein the unlicensed channel is a frequency between 2.4 Ghz and 2.5 Ghz.

In Example 31, the subject matter of any one of Examples 28 to 30 may include, means for sending a wireless reservation message on the first channel.

In Example 32, the subject matter of any one of Examples 28 to 31 may include, wherein the wireless reservation message is a broadcast message.

In Example 33, the subject matter of any one of Examples 28 to 32 may include, wherein the wireless reservation message is a Clear To Send (CTS) message.

In Example 34, the subject matter of any one of Examples 28 to 33 may include, wherein the wireless reservation message has a duration field that is set to a value that is at least the time until the sub-frame boundary plus the time necessary to transmit a PDSCH sub-frame.

In Example 35, the subject matter of any one of Examples 28 to 34 may include, wherein the predetermined threshold and the second threshold are the same value.

In Example 36, the subject matter of any one of Examples 28 to 35 may include, wherein the predetermined threshold and the second threshold are different values.

Example 37 includes subject matter (such as a device, apparatus, or machine) comprising: one or more processors configured to: sense a first channel for a predetermined period of time, the first channel a wireless channel that is not exclusively licensed for cellular wireless communications; determine that an average received power of the first channel indicates that the first channel is idle during the predetermined period of time; and in response to the determination that the first channel is idle: schedule at least one User Equipment (UE) serviced by the eNodeB to receive data on a Physical Downlink Shared Channel (PDSCH) transmitted on the first channel; communicate the schedule to the UE via a control channel on a second channel, the second channel a wireless channel that is licensed for cellular wireless communications; and transmit the PDSCH over the first channel via the first transceiver.

In Example 38, the subject matter of Example 37 may include, wherein the one or more processors are configured to send a reservation message on the first channel in response to the determination that the first channel is idle.

In Example 39, the subject matter of any one of Examples 37 to 38 may include wherein the reservation message is a message defined according to one of an Institute of Electrical and Electronics Engineers (IEEE) 802.11 family of standards.

In Example 40, the subject matter of any one of Examples 37 to 39 may include, wherein the reservation message has a duration field that is at least as large as a sum of a time until the sub-frame boundary and a time needed to send the sub-frame.

In Example 41, the subject matter of any one of Examples 37 to 40 may include wherein the one or more processors are configured to transmit the PDSCH include operations to wait to transmit until a sub-frame boundary.

In Example 42, the subject matter of any one of Examples 37 to 41 may include wherein the one or more processors are configured to implement a backoff procedure prior to scheduling the UE.

In Example 43, the subject matter of any one of Examples 37 to 42 may include wherein the cellular wireless device operates according to one of a Long Term Evolution (LTE) or Long Term Evolution-Advanced (LTE-A) wireless protocol.

What is claimed is:
1. An eNodeB comprising:
a first transceiver to transmit and receive in a first channel using a first wireless protocol, the first channel being in a first frequency range;
a second transceiver to transmit and receive in a second channel in accordance with a cellular wireless protocol, the second channel being in a second frequency range;
a controller to:
determine, via the first transceiver, that an average energy of the first channel over a predetermined period of time is below a predetermined threshold, and in response:
send a wireless reservation message on the first channel via the first transceiver to reserve the first channel for a transmission of a downlink data channel, the wireless reservation message including a duration field that is set to a time that is at least the sum of a time to reach a beginning of a sub-frame boundary and a time to transmit the downlink data channel;
schedule at least one User Equipment (UE) serviced by the eNodeB to receive data on the downlink data channel in the first channel via a control channel on the second channel transmitted by the second transceiver; and
transmit the downlink data channel over the first channel at a cellular sub-frame boundary via the first transceiver.
2. The eNodeB of claim 1, wherein the cellular wireless protocol is a Long Term Evolution (LTE) or Long Term Evolution-Advanced (LTE-A) family of Standards defined by the Third Generation Partnership (3GPP).
3. The eNodeB of claim 2, wherein the first wireless protocol is a protocol according to an Institute for Electrical and Electronics Engineers (IEEE) 802.11 protocol.

4. The eNodeB of claim 1, wherein the wireless reservation message is one of:
a Clear to Send (CTS) message or a Request to Send (RTS) message.

5. The eNodeB of claim 1, wherein the controller is to implement a backoff process, and wherein the controller is to refrain from sending the reservation message, scheduling the UE and transmitting the downlink data channel until the backoff process is successful.

6. The eNodeB of claim 5, wherein the first channel is a channel in the Industrial, Scientific, and Medical (ISM) bands.

7. The eNodeB of claim 1, wherein the cellular sub-frame boundary is a start of an LTE or LTE-A sub-frame.

8. The eNodeB of claim 1, wherein the downlink data channel a Physical Downlink Shared Channel (PDSCH).

9. The eNodeB of claim 1, wherein the control channel is a Physical Downlink Control Channel (PDCCH).

10. A non-transitory machine-readable medium that stores instructions, for execution by one or more processors of an eNodeB, which configure the eNodeB to perform operations to at least:
sense a first channel for a predetermined period of time, the first channel being in a first frequency range;
determine that an average received power of the first channel indicates that the first channel is idle during the predetermined period of time; and
in response to the determination that the first channel is idle:
send a wireless reservation message on the first channel to reserve the first channel for a transmission of a downlink data channel, the wireless reservation message including a duration field that is set to a time that is at least the sum of a time to reach a beginning of a sub-frame boundary and a time to transmit the downlink data channel;
schedule at least one User Equipment (UE) serviced by the eNodeB to receive data on the downlink data channel transmitted on the first channel;
communicate the schedule to the UE via a control channel on a second channel, the second channel being in a second frequency range; and
transmit the downlink data channel over the first channel.

11. The non-transitory machine-readable medium of claim 10, wherein the downlink data channel is a Physical Downlink Shared Channel (PDSCH).

12. The non-transitory machine-readable medium of claim 11, wherein the reservation message is a message defined according to one of an Institute of Electrical and Electronics Engineers (IEEE) 802.11 family of standards.

13. The non-transitory machine-readable medium of claim 12, wherein the control channel is a Physical Downlink Control Channel (PDCCH).

14. The non-transitory machine-readable medium of claim 10, wherein the operations to transmit the downlink data channel include operations to wait to transmit until the sub-frame boundary of the eNodeB.

15. The non-transitory machine-readable medium of claim 10, wherein the instructions further configure the eNodeB to implement a backoff procedure prior to scheduling the UE.

16. The non-transitory machine-readable medium of claim 10, wherein the eNodeB operates according to one of a Long Term Evolution (LTE) or Long Term Evolution-Advanced (LTE-A) wireless protocol.

17. A method comprising:
at an eNodeB:
determine, via a first transceiver, that an average energy of a first channel over a predetermined period of time is below a predetermined threshold, the first channel a wireless channel in a first frequency range, and in response:
select a random backoff period, the random backoff period being less than a predetermined maximum;
determine that the average energy of the first channel over the backoff period is below a second threshold;
schedule at least one User Equipment (UE) serviced by the eNodeB to receive data on a Supplemental Downlink (SDL) Physical Downlink Shared Channel (PDSCH) on the first channel;
communicate the schedule to the UE by transmission of a Physical Downlink Control Channel (PDCCH) on a second channel by a second transceiver, the second channel a wireless channel that is licensed for cellular wireless; and
transmit the SDL PDSCH over the s channel at a cellular sub-frame boundary via the first transceiver; and
determine that errors present on the SDL PDSCH transmitted over the first channel exceeded a predetermined threshold, and in response, increasing the predetermined maximum of the random backoff period.

18. The method of claim 17 comprising providing a PDSCH on the second channel.

19. The method of claim 17, wherein the first channel is a frequency between 2.4 Ghz and 2.5 Ghz.

20. The method of claim 17, comprising sending a wireless reservation message on the first channel.

* * * * *

UNITED STATES PATENT AND TRADEMARK OFFICE
CERTIFICATE OF CORRECTION

PATENT NO. : 9,730,220 B2  
APPLICATION NO. : 15/185890  
DATED : August 8, 2017  
INVENTOR(S) : Bhorkar et al.

Page 1 of 1

It is certified that error appears in the above-identified patent and that said Letters Patent is hereby corrected as shown below:

In the Claims

In Column 15, Line 17, in Claim 8, before "a", insert --is--

In Column 16, Line 37, in Claim 17, delete "s" and insert --first-- therefor

Signed and Sealed this  
Fourteenth Day of April, 2020

Andrei Iancu  
*Director of the United States Patent and Trademark Office*